Patented Mar. 4, 1924.

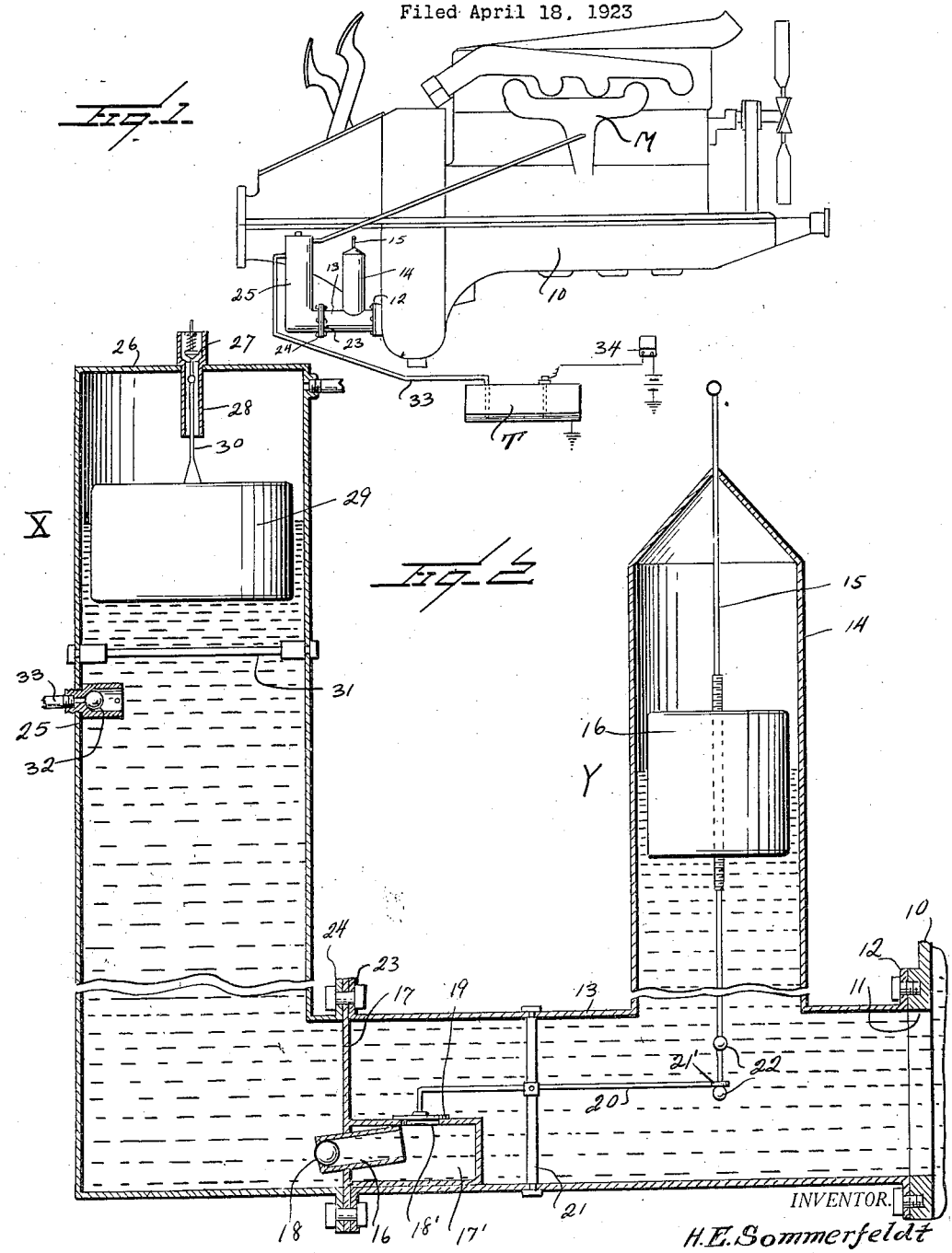

1,485,729

UNITED STATES PATENT OFFICE.

HERMAN E. SOMMERFELDT, OF CUSTER, MICHIGAN.

OIL-FEEDING APPARATUS.

Application filed April 18, 1923. Serial No. 632,896.

*To all whom it may concern:*

Be it known that I, HERMAN E. SOMMERFELDT, a citizen of the United States, residing at Custer, in the county of Mason and State of Michigan, have invented certain new and useful Improvements in Oil-Feeding Apparatus, of which the following is a specification, reference being had to the accompanying drawings.

This invention relates to oil feeding apparatus and more particularly to an apparatus for feeding oil to maintain a constant level in the sump or base of an internal combustion engine.

An important object of the invention is to provide a device of this character which is readily applicable to various types of internal combustion engines and which is sufficiently flexible for possible adjustments thereto to enable accurate control of the oil level of any engine to which it may be applied.

A further object of the invention is to provide a device of this character including means for withdrawing oil from a supply tank for use in the engine which is operated from the engine.

A still further object of the invention is to provide a device of this character which is very readily assembled, which is simple and durable in its construction and which may be very cheaply produced.

These and other objects I attain by the construction shown in the accompanying drawings, wherein for the purpose of illustration is shown a preferred embodiment of my invention and wherein:—

Figure 1 is a side elvation of an engine showing oil feeding apparatus constructed in accordance with my invention; and Figure 2 is a vertical sectional view through the oil feeding apparatus.

Referring now more particularly to the drawings, the numeral 10 indicates an engine base or sump having an opening 11 formed therein, about which is secured one flanged end 12 of a conduit 13. The conduit 13 has extending vertically therefrom a float chamber 14, the lower end of which communicates with the conduit. Within the float chamber is disposed a vertical float rod 15, the upper end of which projects through the upper end wall of the float chamber for a purpose hereinafter to appear. The float rod 15 has mounted thereon a float 16, the mounting of the float upon the rod permitting vertical adjustment of the float thereon. The flange 23 at the opposite end of the conduit 13 engages a flange 24 formed upon the outlet of a vertically disposed suction chamber 25.

The suction chamber 25 is of greater height than the float chamber 14 and in its upper end wall 26 is provided with a downwardly closing check valve 27, the lower end of which is formed to provide a downwardly extending guide tube 28. Mounted within the suction chamber is a float 29 having an upwardly extending stem 30 extending into the guide 28. Downward movement of this float is limited when the upper end of the stem 30 yet remains within the guide 28 by stationary float support 31 extending transversely of the suction chamber 25. The float 29 is so arranged that it relieves the valve 27 to permit closing thereof while level of the oil within the chamber 25 is still above the highest level of oil desired within the sump 10. The upper end of this chamber is connected above the highest position assumed by the float with the intake manifold M of the engine. The suction chamber is provided with an inwardly opening check valve 32, the outer end of which communicates with a conduit 33, the opposite end of which is extended into an oil storage tank T.

At the outer end of the conduit 13 a closure plate 17 is arranged, the edge portions of which extend between the flanges 23 and 24 of the conduit 13 and suction chamber 25, respectinvely, to be held in position therebetween by the securing elements connecting these flanges. This plate has formed thereon a chamber 17′ projecting into the conduit 13, this chamber being in communication with the tank 25 through an opening 16 formed in the plate 17 and normally closed by a check valve opening away from the suction chamber 25. The wall of the chamber 17′ has formed therein an opening 18′ which is controlled by a valve 19 secured to one end of a lever 20, which lever is pivoted intermediate its ends upon a suitable support 21′ mounted in the conduit 13. The opposite end of the lever 20 has formed therein an eye 21 to which the float rod 15 of the float 16 is directed, the float rod being provided at opposite sides of the eye with spaced abutment members 22 large enough to prevent their passage through the eye and so spaced as to permit a limited travel of the float rod before a movement of the lever 20 is accomplished.

In the operation of the device, assuming the level of oil within the chamber 25 would be at a point X, at which point the float 29 holds a check valve 27 in the open position, and the level of oil within the float chamber 14 would be at a point Y, at which point the float 16 maintains the valve 19 in closed position, and the engine would be in operation, if for any reason the oil within the sump lowers below the point Y the valve 19 will be opened and the excess head represented by the difference in the level of oils in the suction and float chambers 25 and 14 will cause the valve 18 to become unseated, with the result that oil will flow through the valves 18 and 18' into the conduit 13 until the float 14 rises to the proper point when the valve 19 will be closed, cutting off communication. This flow of oil from the chamber 25 to the conduit 13 will lower the level within the float chamber, with the result that the float 29 will release the check valve 27 permitting the same to seat. The suction created by the operation of the engine within the intake manifold M is now transmitted to the chamber 30, with the result that the check valve 32 is unseated and oil drawn from the tank T until the level X is again attained within the chamber 25. During this operation the check valve 18 is maintained in the closed position by the suction created within the suction chamber and accordingly none of the oil from the sump and conduit 13 can pass into this chamber even though the float operated valve 19 be in the open position. It will be seen that the only possible way in which the level of oil could become too low within the sump 10 would be by the failure of the contents of tank T and accordingly a suitable low level alarm 34 is provided for this tank.

It will readily be seen that an apparatus constructed in accordance with the foregoing may be very easily applied to the sump of an internal combustion engine and that such an apparatus when once adjusted will require but very little attention. It will be obvious that the construction of the apparatus is capable of some change and modification without materially departing from the spirit of my invention and I accordingly do not limit myself to such specific structure as hereinbefore set forth, except as hereinafter claimed.

I claim:—

1. In a lubricating oil feeding apparatus for the sumps of internal combustion engines, a conduit adapted for attachment to a sump at one end having its outer end closed, a chamber in the conduit adjacent at such outer end, a check valve through the end wall of the conduit and opening inwardly to the chamber, a vacuum tank engaged with the outer end of the conduit, a float chamber communicating with the conduit, a valve communication between the chamber and the conduit, a float within the float chamber and means operated by a predetermined movement of the float within the float chamber for opening the valved communication between the first named chamber and conduit.

2. In apparatus for feeding oil to the sumps of internal combustion engines, two chambers one of which communicates with the sump to have the same fluid level therewith, the other of said chambers communicating with a source of oil supply, intermittently operating suction operated means for maintaining a constant fluid level in the last named chamber higher than the fluid level of the sump, and a connection between the chambers including a valve closing communication between the chambers when the suction operated means is in operation and a second valve closing communication between the chambers when the level within the first named chamber is above a predetermined point.

3. In apparatus for feeding oil to the sumps of internal combustion engines, two chambers one of which communicates with the sump to have the same fluid level therewith and has disposed therein a float, the other of which comprises a vacuum tank and is in communication with the source of vacuum and the source of oil supply, the vacuum tank having a higher level than the fluid level of the sump, and a connection between the vacuum tank and the first named tank including a valve closing communication between the tanks when the vacuum tank is subjected to suction from the source and a second valve operated by the float of the first named tank and closing communication between the tanks when the fluid level within the sump is above a predetermined point.

4. In apparatus for feeding oil to the sumps of internal combustion engines, a vacuum tank in communication with the source of suction and the source of oil supply and having a normal fluid level higher than the normal level of the sump, and a connection between the vacuum tank below the fluid level thereof and the sump, including a valve closing communication between the vacuum tank and sump when the vacuum tank is in operation and a second valve closing communication between the tank and sump when the fluid level within the sump is above a predetermined level.

5. In a lubricating oil feeding apparatus for the sumps of internal combustion engines, a conduit adapted for attachment to a sump at one end having its outer end closed, a chamber in the conduit adjacent at such outer end, a check valve through the end wall of the conduit and opening inwardly to the chamber, a vacuum tank engaged with the outer end of the conduit, a float chamber communicating with the conduit, a valve communication between the chamber and the conduit, a float within the float chamber and means operated by a predetermined movement of the float within the float chamber for opening the valved commuication between the first named chamber and conduit, the closure of the outer end of the conduit comprising a removable plate, said chamber being integral with said plate.

In testimony whereof I hereunto affix my signature.

HERMAN E. SOMMERFELDT.